United States Patent Office
3,252,928
Patented May 24, 1966

3,252,928
AIR-DRY SURFACE COATING RESIN PREPARED FROM MONOHYDROXYALKYLENE TETRAHYDROFURAN
Gus Nichols, Whiting, Ind., assignor to Standard Oil Company, Chicago, Ill., a corporation of Indiana
No Drawing. Filed Mar. 19, 1962, Ser. No. 181,340
6 Claims. (Cl. 260—22)

This invention relates to resins of the polyester condensation reaction type, particularly resins which are suitable for the formation of an air-dry surface coating film, and preferably, resins which have substantial solubility in water.

Resins have been used for a long time in the production of surface coating films. These so-called alkyd resins which are extensively used for production of surface coatings possess reasonable air-dry properties at ordinary atmospheric temperatures. The term air-dry means the ability of the resin to form a rigid solid film when exposed to the atmosphere at atmospheric temperatures, particularly 50°–100° F. These alkyd resins are soluble in hydrocarbon solvents.

Extensive efforts have been made to produce materials suitable for surface coating application which materials can use water as the vehicle. Air-dry surface coatings have been produced by the use of true emulsions or latex emulsions when water is the vehicle. However, for reasons of flexibility in formulation and storage stability, a truly water soluble surface coating film is of great interest to the paint industry.

A novel resin has been discovered which is water soluble and has good air-drying properties when exposed to the atmosphere at atmospheric temperatures in the form of a surface coating film. This resin also has good storage stability and is suitable for the formation of an air-dry film having good hardness properties. This resin is the reaction product of a novel organic solvent soluble resin and a hereinafter defined alkaline agent. The novel organic solvent soluble resin is soluble in organic solvents and has good air-drying properties when exposed to the atmosphere at atmospheric temperatures and is also suitable for the formation of an air-dry film having good hardness properties.

The air-dry properties of the resins of the invention are to be understood as indicating that when a surface coating film—for example, 3 mils thick—is formed from an organic solvent solution or water solution, the film will harden and become completely dry, forming a solid structure such as afforded by present air-dry paints. The time needed to form a dry film will vary with the particular resin, the temperature to which the film is exposed, and the presence or absence of driers. The presence of cobalt and lead driers such as normally utilized in the paint industry permits the formation of air-dry films in periods of time permitting use on exterior and interior surfaces.

Good drying times are important in both industry and the home. The faster a coating dries the sooner the coated object or surface can be utilized.

The property of storage stability refers to the ability of the water solution of the resin to remain in storage in a form acceptable to the ultimate purchaser. Where lengthy shelf life is expected of a coating material (e.g., paint), good storage stability is especially important both to the seller and purchaser.

The hardness property refers to the resistance of a dry film to scratching and is important in the film's uniformity of protection of a surface.

RESIN

The novel water soluble resin is the reaction product of the novel organic solvent soluble resin and an alkaline agent.

The organic solvent soluble resin comprises a polycondensation reaction product of one or more benzene tricarboxylic acids or anhydrides thereof, a furan derivative member having one hydroxyl group, and a monoglyceride type product of an unsaturated fatty acid and glycerol or an erythritol or an alcoholysis product of a semidrying and/or drying fatty oil with glycerol or an erythritol which alcoholysis product corresponds on the average to a monoglyceride type product. Also, the resin can be prepared by utilizing a polyalkylene glycol monoalkyl ether, a monohydric paraffinic alcohol, an unsaturated fatty acid group containing ester having one hydroxyl group, an alkylene glycol, and an endo-oxygen containing acid. The ether, alcohol and ester can be substituted for part of the furan derivative member in the formulation for the resin, the glycol can be substituted for part of the material in the formulation, and the endo-oxygen containing acid is an additional acid in the formulation.

The benzene tricarboxylic acids and/or anhydrides which enter into the reaction include trimellitic acid, trimellitic anhydride, hemimellitic acid, hemimellitic anhydride and trimesic acid. In addition to the above unsubstituted acids and anhydrides, there may be utilized substituted acids and anhydrides. These other substituents must be inert with respect to entering into the reaction. Types of substituents which may be present are alkyl groups having 1–5 carbon atoms and preferably methyl, t-butyl, sec-butyl, and neopentyl; and halogens, preferably chlorine. Examples of the substituted compounds are: t-butyl trimellitic acid, methyl trimellitic acid, trichlorotrimellitic acid, and methyl hemimellitic acid. For convenence, the unsubstituted and substituted acids and anhydrides are hereinafter generally referred to as acidic members and the amounts of the various reactants charged to the polycondensation zone are given in mole ratios with respect to the acidic member charged to that zone.

The furan derivative which is reacted with the acidic member includes one or more of the monohydroxyl tetrahydrofurans, monohydroxyalkylene furans having from 1 to about 4 carbon atoms in the alkylene group, esters of tetrahydrofuran substituted aliphatic acids having from 1 to about 7 carbon atoms in the aliphatic acid group, esters of furan substituted acids having from 1 to about 7 carbon atoms in the aliphatic acid group, and substituted derivative of the tetrahydrofurans and esters. The monohydroxyl tetrahydrofurans include the 2- and 3-monohydroxy tetrahydrofurans. The monohydroxyalkylene tetrahydrofurans include 2-hydroxymethylene tetrahydrofuran, 3-hydroxymethylene tetrahydrofuran, 2-hydroxypropylene tetrahydrofuran and 2-hydroxybutylene tetrahydrofuran. The hydroxymethylene and hydroxyethylene tetrahydrofurans are preferred. The esters of tetrahydrofuran and furan substituted aliphatic acids refer to esters of the acids and polyhydric paraffinic alcohols having from 2 to about 4 hydroxyl groups. The resulting ester has 1 hydroxyl group. The tetrahydrofuran substituted aliphatic acids and furan substituted acids have from 1 to about 7 and preferably 1 to about 3 carbon atoms in the aliphatic acid group and preferably only carbon, hydrogen and oxygen in the aliphatic acid group. These acids include the tetrahydrofuran and furan substituted methanoic acids, ethanoic acids, propenoic acids, pentadienoic acids, and heptanoic acids. The tetrahydrofuran and furan substituted methanoic acids are especially preferred. In addition to the unsubstituted tetrahydrofurans and esters, substituted tetrahydrofurans and esters may be utilized and include 5-chloromethyl 3-hydroxy tetrahydrofuran, 2,5-dimethyl 2-hydroxymethylene tetrahydrofuran, and 2-ethyl 2-hydroxypropylene tetrahydrofuran; and the esters of the tetrahydrofuran and furan substituted aliphatic acids such as 3-chloro 2-tetrahydrofuran methanoic acid, 4-bromo-2-furan methanoic acid, 5-chloro-2- furan methanoic acid, 5-t-butyl-2-furan methanoic acid and 2,4-dimethyl-3-furan methanoic acid.

The above described polyhydric paraffinic alcohol having from 2 to about 4 hydroxyl groups refers generally to glycols, glycerol, trimethylol ethane, trimethylol propane and pentaerythritol. The ester is prepared in the conventional manner from the tetrahydrofuran or furan substituted aliphatic acid and the polyhydric paraffinic alcohol. When the alcohol has more than 2 hydroxy groups sufficient acid is used so that the ester has only one hydroxy group.

Especially useful resins are prepared when the furan derivative member is a hydroxymethylene tetrahydrofuran or 2-hydroxymethylene tetrahydrofuran such as the ester of ethylene glycol and a furan monocarboxylic acid such as 2-furan methanoic acid.

The furan derivative member and the acidic member are present in the polycondensation zone in the respective mole ratio of from about 0.4 to about 1. This ratio means that about 0.4–1 moles of the defined furan derivative member are charged to the polycondensation zone for each mole of the acidic member therein.

Other monohydroxyl members may be substituted for part of the defined furan derivative member. These monohydroxyl members refer to polyalkylene glycol monoalkyl ethers having from 2 to 8 ether groups, each alkylene group having from 2 to 3 carbon atoms, the alkyl group having from 1 to 8 carbon atoms; saturated alcohols having from 2 to about 18 carbon atoms and containing only carbon, hydrogen and oxygen; and unsaturated fatty acid group containing esters. Numerous species of the defined ethers are known and available commercially under the "Carbitol" trade name. Specifically, the defined ethers are known as alkyl Carbitols. The Carbitols are alkylation reaction products of ether glycols and alkanols. Examples of ether glycols are ethylene glyclo, triethylene glycol and polyethylene glycol containing not more than 8 ether linkages; and dipropylene glycol and polypropylene glycol containing not more than 8 ether linkages. Examples of alkanols are methanol, ethanol, butanol and octanol. The preferred alkyl Carbitol is diethylene glycol monobutyl ether which is the product of diethylene glycol with butanol. This and other Carbitols are set forth in copending application Serial No. 21,587, filed April 12, 1960, now U.S. Patent 3,120,499. The saturated alcohols have from 2 to about 18 carbon atoms and are known. Such alcohols include ethanol, butanol, octanol, decanol and octadecanol. The unsaturated fatty acid group containing esters refer to esters of unsaturated fatty acids and polyhydric paraffinic alcohols having 2 to about 4 hydroxyl groups and preferably 2 to 3 hydroxyl groups. The unsaturated fatty acids can be derived from semidrying and drying oils and include such acids as tall oil fatty acids, soybean oil fatty acids, safflower oil fatty acids and linseed oil fatty acids. The monohydroxyl member may be present up to about 0.6 mole per mole of said acidic member provided that the sum of the monohydroxyl member and the defined furan derivative member is not more than about one mole per mole of the acidic member which means that the reaction product of the furan derivative member, monohydroxyl member and acidic member is essential a monoester of the acidic member.

The ester of the defined acidic member is condensed in a polyesterification condensation reaction with a material affording two hydroxyl groups per molecule. It will be evident from the following disclosure that this hydroxyl group affording material will provide two hydroxyl groups per molecule only as an average of the molecules in the material. When this material is an alcoholysis product, there may be on the average somewhat more than two hydroxyl groups per molecule; it is intended that this material in effect function as a dihydric alcohol.

The dihydroxyl group affording material may be an ester of an unsaturated fatty acid containing at least about 10 carbon atoms and a polyhydric paraffinic alcohol (alkane polyol) containing 3–4 hydroxyl groups. The polyhydric alcohols include glycerol, erythritol, pentaerythritol, treitol, dipentaerythritol, trimethylol ethane and trimethylol propane. The unsaturated fatty acid contains at least about 10 carbon atoms and preferably about 16–24 carbon atoms. The fatty acid may be only one fatty acid or a mixture of fatty acids. When only one fatty acid is used to prepare the ester, it is preferred that the fatty acid contain at least two olefinic bonds (e.g., polyethenoid fatty acid). Examples of fatty acids containing at least two olefinic bonds are: linoleic, hiragonic, eleostearic, moroctic, arachidonic, clupanodonic, and nisinic. An economical and preferred source of fatty acids are the natural mixtures of acids obtained from semidrying and drying fatty oils such as tall oil, soybean oil, linseed oil, safflower oil, tung oil, dehydrated castor oil, perilla oil, menhaden oil, sardine oil, etc. Especially preferred are the polyethenoid fatty acids from drying oils. When the defined polyol is glycerol, the ester charged to the reaction zone is properly termed a monoglyceride of the particular fatty acid. For convenience, the term monoglyceride is utilized to describe this ester even when the polyol utilized in the formation of the ester is some other three or four hydroxyl group containing polyol.

Instead of more or less pure monoglyceride, the dihydroxy group affording material may be the alcoholysis product of the hereinabove defined polyol and a semidrying fatty oil, drying fatty oil or a mixture of the two oils. When the polyol used in the alcoholysis reaction is a glycerol, then the alcoholysis product will be a monoglyceride of the fatty acids contained in the semidrying oil, drying oil or mixture, and it also will contain any nonreactive materials in the fatty oil. When the reacting polyol is other than glycerol, the alcoholysis product will be a mixture of true glycerides and glyceride-type esters of the various acids and the reacting polyol. Sufficient reacting polyols are utilized in the alcoholysis reaction to have in the alcoholysis product compounds affording on the average two hydroxyl groups per molecule.

Any of the semidrying or drying oils containing unsaturated fatty acid esters, whether of vegetable or marine life origin, may be utilized. Mixtures of the semidrying oils and the drying oils may be also utilized. An especially suitable semidrying oil is tall oil. Examples of drying oils are: linseed, tung, safflower, dehydrated castor, perilla, menhaden and sardine. The drying oils are preferred.

Particularly useful air-drying resins are obtained when utilizing monoglycerides of tall oil, and/or safflower oil fatty acids, or an alcoholysis product of safflower oil with glycerol.

When special properties are desired, the dihydroxyl group affording material may be a mixture of one or more of the various monoglycerides or a mixture of monoglyceride with an alcoholysis product or a mixture of alcoholysis product from two or more fatty oils, etc.

The defined dihydroxyl group affording material is charged to the polycondensation zone in a mole ratio to acidic member charged therein of from about 0.8 to about 1.9 and preferably from about 1.0 to about 1.5 with the ratio of total hydroxyl groups of said furan derivative member (and monohydroxyl member), and material to total acidic groups of said acidic member being from about 0.9 to about 1.4 and preferably from about 1.04 to about 1.15. The mole ratios of material to acidic member have been derived from the ratios of hydroxyl groups to total acidic groups (e.g., 0.9) using the aforementioned mole ratios of the furan derivative member to acidic member in the calculations. To illustrate, when 1 mole of the furan derivative member and 1 mole of the acidic member are present and a ratio of hydroxyl groups to acidic groups of about 1.04 is desired, the mole ratio of the material to the acidic member is 1.06. Especially suitable mole ratios of the acidic member, furan derivative member, monohydroxyl member and dihydroxyl group affording material are 1:1:0:1.1 and 1:0.5:0.5:1.1, particularly when trimellitic anhydride, 2-hydroxymethylene tetrahydrofuran, diethylene glycol monobutyl ether and safflower monoglyceride are the respective reactants. The first ratio does not include the defined ether.

In addition to the defined material, an alkylene glycol containing from 2 to about 7 carbon atoms in the alkylene group may be utilized. This glycol replaces only part of the material in the formulation of the resin. Examples of the alkylene glycol are ethylene glycol, propylene glycol (including neopentyl glycol), pentylene glycol and heptylene glycol with the lower glycols being preferred such as ethylene glycol. The sum of the glycol and material are in a mole ratio to the acidic member of from about 0.8 to about 1.9 and preferably from about 1.0 to about 1.5. The material is present in an amount sufficient to characterize the resin as an air-drying resin which means that the fatty acid groups in the material are present in a sufficient amount to give the desired air-drying properties to the resin. Generally, the amount of the fatty acid groups in the resin formulation is determined by calculating the oil lengths of the resin. The term "oil length" is known in this art. Suitable oil lengths for the novel organic solvent soluble resin are similar to those in the art such as oil lengths of about 30% to about 70%.

The polycondensation product is a material characterized by an acid number of about 25–70 (acid number is the mg. KOH per gram of resin) and preferably about 35–60. Also, this resin is characterized by air-drying properties when exposed to the atmosphere at ordinary temperatures in the form of a surface coating film.

Generally, the preparation of the ester of the acidic member is carried out by intermingling the acidic member and the furan derivative member (and monohydroxyl member) at a temperature on the order of about 240–300° F. until all of the acidic member has passed into the solution, i.e., reacted. The reaction is carried out utilizing a reflux system permitting trapping out of the water formed in the reaction.

The polycondensation reaction is carried out in the usual maner. The reaction herein has usually been carried out in a vessel provided with a condensing system permitting trapping out of water of reaction. The reactants generally are agitated at a temperature of about 350–400° F. and more usually about 360° F. The reaction is continued until a desired cure time of about 6–20 seconds and preferably 6–10 seconds, and the desired acid number are reached or to the point where the viscosity increase of the contents of the reaction zone indicate that the gelation point is being approached. Cure time is measured in seconds by applying a drop two of the resin on a hot plate (about 392° F.) and drawing a metal point back and forth across the resin until a solid film occurs. Decreased cure time is brought about by cooking the resin for additional time.

The resin, which is a translucent material of color ranging from clear to tan dependent upon the reactants, is controlled to the desired acid number and cure time. This resin is extremely soluble in the hydrocarbon solvents and oxygenated organic solvents commonly used in the surface coating field. The better known of these solvents are methyl alcohol, ethyl alcohol, butyl alcohol, acetone, methylethyl ketone, Cellosolve, benzene, toluene, xylene, and also in mixed solvents such as 60:40 volume ratio of xylenes and butyl alcohol.

When trimesic acid is the acidic member, it is advantageous to prepare the resin by charging the acidic member and dihydroxyl group affording material to the kettle, heating the contents to about 400–420° F. until an acid number of about 180–200 is reached, cooling the contents to about 300–340° F., charging the tetrahydrofuran (and monohydroxyl member), and heating the contents at about 300–340° F. until the desired acid number and cure time are reached.

Another general method of preparing the novel organic solvent resin of this invention is carried out by charging the acidic member, furan derivative member (and monohydroxyl member), and dihydroxyl group affording material at the same time to the resin kettle. The temperature is first controlled to a value below about 340° F. and preferably between about 260° F.–330° F. and held until the monoester of the acid is primarily formed, and then raised to a value above about 340° F. and preferably between about 350° F.–440° F. and held until the polycondensation reaction product is obtained having the desired cure time and Acid Number. The temperatures will vary somewhat depending on the particular acid being utilized and the physical state of the acid (e.g., liquid or solid) at the lower temperature. When trimellitic anhydride is utilized, a first temperature of 240° F.–330° F. and a second temperature of 350° F.–440° F. are suitable. The acids or anhydrides can also be dissolved in suitable solvents and the method carried out. This method can also be utilized in preparing polycondensation reaction products from benzene tetracarboxylic acids or anhydrides such as pyromellitic dianhydride.

The monoester of the acidic member is primarily produced at the lower temperature and the polycondensation reaction product or resin is then produced at the higher temperature. This method produces a very suitable resin having the properties desired for the resins of this invention. Without the above desired temperature control, the usual result of cooking the reactants at the same time is a messy gel-like material which is difficult to handle.

The organic solvent soluble resin of this invention includes the utilization of a 3,6 endo-oxo 1,2,3,6 tetrahydrophthalic acid or its anhydride. These compounds are readily prepared from maleic anhydride and furan by the Diels-Adler addition reaction. The acid and anhydride may be unsubstituted or substituted. The substituents should be inert with respect to the reaction which produces the resin. Suitable substitutents are alkyl groups having 1–5 carbon atoms and preferably methyl and ethyl; and halogens, preferably chlorine. The acid and its anhydride may be considered an endo-oxygen containing acid.

Generally, the acidic member is first reacted with the defined furan derivative and/or defined monohydroxyl member to produce the ester of the acidic member, and the endo-oxygen containing acid and the defined dihydroxyl group affording material are then charged to the polycondensation reaction zone.

The mole ratio of the endo-oxygen containing acid to the defined acidic member can be from a small value on up to an appreciable value. The range of mole ratios is governed generally by the desired hardness of the film formed from the resin and the desired oil length of the resin. A suitable range of the molecular ratio is from about 0.3 to about 1.5 and preferably from about 0.5 to about 1.5.

The addition of the endo-oxygen containing acid in the resin formulation permits the utilization of the defined monohydroxyl member with or without the defined furan derivative member although the furan derivative member is preferred in a minimum of 0.3 moles per mole of acidic member and results in resins having particularly desirable air-drying properties. A suitable mole ratio of the alcoholic member (furan derivative member and/or monohydroxyl member) to the acidic member is from 0.3 to about 1.

The dihydroxyl group affording material is charged in an amount sufficient to give a ratio of total hydroxyl groups to total acidic groups of from about 0.9 to about 1.4 and preferably from about 1.04 to about 1.15. Based on the mole ratio ranges given for the acidic member, and endo-oxygen containing acid, the material is charged in a respective mole ratio to the endo-oxygen containing acid and the defined acidic member of from about 1.1:0.3:1 to about 4.0:1.5:1 corresponding to the broader range of the hydroxyl to acidic group ratios (0.9–1.4:1).

Especially suitable mole ratios of the acidic member, furan derivative member, monohydroxyl member, endo-oxygen containing acid, dihydroxyl group affording material, and glycol are 1:0.5:0.5:1:1.5:0.8, particularly when trimellitic anhydride, 2-hydroxymethylene tetrahydrofuran, diethylene glycol monobutyl ether, 3,6 endo-oxo, 1,2,3,6 tetrahydrophthalic anhydride, linseed oil monoglyceride, and 2,2-dimethylpropylene glycol are the respective reactants, and 1:0.3:0.7:0.5:1.65:0, particularly when trimellitic anhydride, 2-hydroxymethylene tetrahydrofuran, decanol, 3,6 endo-oxo, 1,2,3,6 tetrahydrophthalic anhydride and linseed oil monoglyceride are the respective reactants. The latter respective mole ratio contains none of the defined glycol.

The organic solvent soluble resin of this invention may be utilized in its organic solvent solution to form air-drying coatings having good drying properties. In addition, the dry films from these coatings have good hardness properties.

The solution preferably contains a cobalt and lead drier to speed up the drying reaction. The various cobalt and lead driers in the paint industry are suitable for this purpose. In addition, the solution may contain pigments such as titanium dioxide and color imparting bodies permitting the lay down of a film of the paint type.

Even though the solvent soluble resin is particularly useful in the surface coating field, it is preferred that the resin be converted to a water soluble form permitting the use of water as the vehicle for a true water solvent surface coating affording composition.

WATER SOLUBLE RESIN

The water soluble resin consists of the organic solvent soluble resin produced by the reaction of the polycondensation reaction product and an alkaline reacting agent. The resin and the agent are reacted until a water soluble resin is obtained. Usually enough agent is used to neutralize the acidity of the resin; less may be used. The amount of alkaline reacting material is most readily determined by following the pH of the aqueous medium. The resin passes into solution substantially completely at a pH of about 5. In practically all instances, the resin will be in a complete solution at a pH of about 6. The use of alkaline agent in excess of that needed to bring all the polyester product into solution is not harmful. Suitable ranges of the pH are from 6–9 with the preferred range being from 7–8.

The alkaline reacting agent may be ammonia, alkylamine, heteroamine, or an alkanolamine. Aqueous solutions of ammonium hydroxide are suitable. A particularly useful concentration is about 2% $NH_4OH$ (by weight) since this will result in a water soluble resin having the desired pH and a resin content based on the organic solvent soluble resin of about 45% by weight based on the weight of solution. The alkylamines, particularly the lower molecular weight containing not more than 4 carbon atoms in each alkyl group such as triethylamine are suitable. The alkanolamines, such as 2-amino-2-methyl-1-propanol, ethanolamine and dimethylethanolamine, are especially suitable. The heteroamines, such as morpholine, pyridine, and piperidine may also be used. The type of alkaline reacting material utilized is determined in part by the characteristics desired in the final water soluble resin; also, by the type of resin products which is to be converted to a water soluble form.

The neutralization reaction is carried out by contacting the resin and the aqueous alkaline reacting medium. It is preferred that the temperature be warm, i.e., maintained in the region of 100–160° F. The two are agitated until the resin has passed into solution. The water solutions of the water soluble resin are clear liquids usually containing some opalescent appearance; the solutions may be colorless or colored, depending on the particular water soluble resin present.

The water soluble resin behaves essentially in the same manner as the solvent soluble resin when exposed to oxygen or air in that an air-dry solid is formed. Especially satisfactory water soluble resins are produced when the oil length of the resin is from about 40% to about 65%. These water soluble resins produce air-dry coatings having good drying properties and films having good hardness properties. In addition, the resins have good stability under storage conditions.

When a paint composition is to be formed, the organic solvent soluble resin is contacted with the defined aqueous alkaline agent and then the desired amounts of a pigment such as titanium dioxide are added. The aqueous solution and the pigment are then mixed. The various cobalt and lead driers in the paint industry may then be added. In addition, color imparted bodies may be utilized to give color in the paint. Many paints prepared from these resins exhibit very good gloss characteristics.

Examples

Typical resins of the invention and paint compositions prepared from these resins using water as the vehicle have been prepared and are set out hereinbelow.

RESIN I 192.0 grams of trimellitic anhydride (1.0 mole) and 102.0 grams of 2-hydroxymethylene tetrahydrofuran (1.0 mole) were charged to a four-nocked, two liter resin kettle provided with facilities for nitrogen and having a thermometer, propeller-type stirrer and Dean Stark trap. The charged materials were heated between about 240° F. to 300° F. for about 1 hour until the solution became clear. Then 390 grams of safflower oil monoglyceride (1.1 mole) were introduced and the temperature was raised to about 360° F. and held until a cure time of about 8 seconds and an acid number of about 52 for the solution were reached. The time was approximately 4 hours.

Two portions, each about 135 grams, of this resin were converted into an aqueous solution. The first, Resin IA, was dissolved in about 165 grams of anqueous ammonia solution (about 1.8% by weight as $NH_4OH$) with stirring. 1.35 grams of a commercial cobalt naphthenate drier solution (6% cobalt by weight) and 1.35 grams of a commercial lead naphthenate drier solution (24% by weight lead) were then dissolved in the solution. The resulting solution had a pH of about 7–8 and had a light straw-like color. This solution was applied to a tin plate to give a wet coating of about 3 mils. in thickness. The coating became dry after approximately 12 hours.

The second portion, Resin IB, was converted to a paint by dissolving the Resin IB in about 165 grams of the aqueous ammonia solution with stirring. 135 grams of titanium dioxide were then mixed with the aqueous solution in a small porcelain ball-mill. 1.35 grams of the commercial cobalt drier solution (6% cobalt by weight) and 1.35 grams of the commercial lead drier solution (24% lead by weight) were then dissolved in the paint solution. The solution had a pH of about 7–8 and a white glossy appearance. Coatings (about 6 mils in thickness) of the solution on glass plates became dry after approximately 10 hours.

Samples (about 2 ounces each) of Resin IA and Resin IB solutions were placed in glass jars, covered and stored in a 120° F. oven to determine can stability (storage stability). Can stability was determined by the number of weeks that the solution could be stored in the oven before any separation occurred. Separation in the Resin IA solution could be visually seen. Separation in Resin IB solution (paint solution) was determined by the occurrence of lumps (separated resin) in a coating of the solution applied on a glass plate. Samples of Resin IA remained as solutions for a minimum of 5 weeks before any separation was noted. Samples of Resin IB (paint) remained as solutions for a minimum of 7 weeks before any separation was noted.

The coating from Resin IA was tested for hardness by drawing pencils of increasing "H" hardness over the coating until a scratch in the film was noted. This coating tested 5H–6H, which meant that a 5H pencil did not scratch the coating but a 6H pencil did.

A comparison resin A was prepared from 192.0 grams of trimellitic anhydride (1.0 mole), 162 grams of butyl Carbitol (1.0 mole), and 390 grams of safflower oil monoglyceride (1.1 mole) by the procedures described for Resin I. The solution had a cure time of about 8 seconds and an acid number of about 52.

Two portions of this resin were converted into an aqueous resin solution and an aqueous paint solution by the same procedures described for Resin I.

Coatings of the resin solution and the paint solution required a minimum of about 48 hours before becoming dry. The can stability for the resin solution was 2–3 weeks and for the paint solution was 3–4 weeks. The air-dry coating from the resin solution had a pencil hardness of 2H–3H.

The above results demonstrate the improved drying time and hardness of coatings from Resin I and improved can stability of Resin I over the same properties of the comparison resin A. Coatings from Resin I dried in 12 hours and had a hardness of 5H–6H, while those of comparison resin A required a minimum of 48 hours to dry and had a hardness of 2H–3H. The paint samples of Resin I remained in the 120° oven for 7 weeks in satisfactory condition while those of the comparison resin A lasted only 3–4 weeks.

RESIN II 192.0 grams of trimellitic anhydride (1.0 mole), 75.0 grams of a monoester (0.5 mole) of furoic acid and ethylene glycol, and 51.0 grams of 2-hydroxymethylene tetrahydrofuran (0.5 mole) were charged to a resin kettle described in the preparation of Resin I and heated between about 260° F. to 300° F. until the solution became clear. 390.0 grams of safflower oil monoglyceride (1.1 mole) were then charged and the temperature raised to about 360° F. and held until a cure time of about 15–20 seconds and an acid number of about 48–52 were reached.

Separate portions of this resin were converted into an aqueous resin solution and an aqueous paint solution using the procedures described for Resin I. Coatings of the aqueous resin solution dried in about 5 hours and of the paint solution 4½–5 hours. The pencil hardness of the coating from the aqueous resin solution was 7H–8H.

The above results demonstrate the superior drying time (5 hours) and pencil hardness (7H–8H) of coatings from Resin II as compared to the drying time (minimum 48 hours) and pencil hardness (2H–3H) of the comparison resin A.

A resin similar to Resin II may be prepared from 1 mole of trimellitic anhydride, 0.5 mole of a monoester of tetrahydrofuroic acid and ethylene glycol, 0.5 mole of 2-hydroxymethylene tetrahydrofuran and 1.1 moles of safflower oil monoglyceride. The properties of this resin will be superior to those of comparison resin A.

RESIN III 192.0 grams of trimellitic anhydride (1.0 mole) and 102 grams of 2-hydroxymethylene tetrahydrofuran (1.0 mole) were charged to a resin kettle described in the preparation of Resin I and heated at about 300° F. until a clear solution was obtained. 390.0 grams of tall oil monoglyceride (1.1 mole) were then added to the solution and the temperature raised to about 360° F. for about 4 hours. This solution had a cure time of about 12 seconds and an acid number of about 44.

Two portions of this resin were converted into an aqueous solution and an aqueous paint solution using the procedures described for Resin I. Coatings from the resin solution dried in about 10–13 hours and those from the paint solution dried in about 10 hours. The coating from the resin solution had a pencil hardness of 7H–8H. No can stability tests were run.

The above results demonstrate that Resin III prepared from a tall oil monoglyceride (semidrying oil derivative) produced coatings having good drying times and hardness properties compared to those properties of Resin I prepared from a safflower oil monoglyceride (drying oil derivative).

RESIN IV

Resin IV of this invention was prepared from 192.0 grams of trimellitic anhydride (1.0 mole), 51.0 grams of 2-hydroxymethylene tetrahydrofuran (0.5 mole), 81.0 grams of butyl Carbitol (0.5 mole), and 390 grams of safflower oil monoglyceride (1.1 mole) by the procedures described for Resin I. This resin had a cure time of about 8 seconds and an acid number of about 52.

Separate portions of this resin were converted into an aqueous resin solution and an aqueous paint solution by using the same procedures described in Resin I.

Coatings (about 3 mils) of the aqueous resin solution on tin plates dried at about 16–24 hours and the coatings (about 6 mils) of the paint solution dried in the same time (16–24 hours). The can stability of the resin solution was 4–5 weeks and of the paint solution was 5–6 weeks. Dry coatings (films) from the resin solution had a pencil hardness of 3H–4H.

Comparison of the results from Resin IV with those of resin A demonstrates the superiority of Resin IV. The properties of drying time, can stability and hardness for Resin IV were 16–24 hours, 5–6 weeks, and 3H–4H compared to 48 hours, 3–4 weeks, and 2H–3H for resin A.

RESIN V

Resin V was prepared from 1 mole of trimellitic anhydride, 0.5 mole of 2-hydroxymethylene tetrahydrofuran, 0.5 mole of tall oil diglyceride and 1.1 moles of tall oil monoglyceride. The preparation followed the procedures described for Resin I. The solution had a cure time of about 18 seconds and an acid number of about 52.

This resin was converted into an aqueous resin solution using the procedures described for Resin I. Coatings from the resin solution dried in about 24–36 hours and had a pencil hardness of 7H–8H. The can stability of the resin solution was 5 weeks.

A comparison resin B was prepared from 1.0 mole of trimellitic anhydride, 0.5 mole of butyl carbitol, 0.5 mole of tall oil diglyceride and 1.1 moles of tall oil monoglyceride using the same procedures as described for the Resin V. The resulting resin solution had a cure time of about 19 seconds and an acid number of about 53. Coatings from the aqueous resin solution required more than 48 hours to dry and had a hardness of 3H–4H. The can stability of the gaseous resin solution was 2 weeks.

The above results demonstrate the superior drying time and hardness of coatings and superior can stability of Resin V over the same properties of comparison resin B. Comparison of these properties of Resin V with resin B reveals a drying time of 24–36 hours compared to more than 48 hours, a hardness of 7H–8H compared to 3H–4H, and a can stability of 5 weeks compared to 2 weeks, respectively.

RESIN VI 192.0 grams of trimellitic anhydride (1.0 mole) and 61.2 grams of 2-hydroxymethylene tetrahydrofuran (0.6 mole) were charged to a resin kettle described in the preparation of Resin I and heated at about 300° F. until a clear solution was obtained. 490.9 grams of safflower oil monoglyceride (1.4 mole) were then added to the solution and the resulting solution heated at about 360° F. for about 4 hours. This solution had a cure time of about 10 seconds and an acid number of about 49.

Two portions of this resin were converted into an aqueous resin solution and an aqueous paint solution using the procedures described for Resin I. Coatings from the resin solution dried in about 12–14 hours and those from the paint solution dried in about 10 hours. The can stability for the aqueous resin solution was a minimum of 6 weeks and for the aqueous paint solution was a minimum of 7 weeks.

The above results demonstrate that suitable resin and paint formulations can include a mole ratio of 2-hydroxymethylene tetrahydrofuran to trimellitic anhydride of 0.6 and a mole ratio of safflower oil monoglyceride to trimellitic anhydride of 1.4. The results also demonstrate that the Resin VI has better drying times (12–14 hours for aqueous resin solution) and can stability (min. 7 weeks for paint) compared to those properties (min. of 48 hours and 3–4 weeks) of the comparison resin A.

RESIN VII 192.0 grams of trimellitic anhydride (1.0 mole), 51.0 grams of 2-hydroxymethylene tetrahydrofuran (0.5 mole), and 81.0 grams of butyl carbitol (0.5 mole) were charged to the resin kettle described in the preparation of Resin I and heated up to about 239° F. (115° C.) until the solution became clear. Then 166.0 grams of 3,6 endo-oxo, 1,2,3,6 tetrahydrophthalic anhydride (1.0 mole), 540 grams of linseed oil monoglyceride (1.5 mole), and 80.0 grams of neopentyl glycol (0.8 mole) were charged and the solution was cooked at about 338° F. (170° C. until a cure time of 20–24 seconds and an acid number of about 52 were reached.

Two portions of this resin were converted into an aqueous resin solution and an aqueous paint solution using the procedures described for Resin I. Coatings of the resin solution and paint solution dried in about 8 hours and about 7 hours respectively. The pencil hardness of the coating from the aqueous resin solution was 7H–8H.

RESIN VIII 192.0 grams of trimellitic anhydride (1.0 mole), 158.0 grams of n-decyl alcohol (0.7 mole), 33.6 grams of 2-hydroxymethylene tetrahydrofuran (0.3 mole), 83.0 grams of 3,6 endo-oxo, 1,2,3,6 tetrahydrophthalic anhydride (0.5 mole), and 585.0 grams of linseed oil monoglyceride (1.65 mole) were converted into a resin by the procedures described for Resin VII. The n-decyl alcohol and 2-hydroxymethylene tetrahydrofuran were initially charged along with the trimellitic anhydride to the resin kettle and heated. The other reactants were then added. The resulting solution had a cure time of 20–24 seconds and an acid number of about 52.

A single portion of this resin was converted into an aqueous resin solution by the procedures described for Resin I except that triethylamine replaced ammonia in the aqueous solution. Concentration of triethylamine was about 8–10% by weight based in the weight of water. Coatings of this resin solution dried in about 5–6 hours. The coatings had a pencil hardness of 3H–4H.

The results from Resins VII and VIII demonstrate the improved drying times (8 hours, 5–6 hours) and hardness (7H–8H, 3H–4H) compared to the same properties (48 hours, 2H–3H) of comparison resin A.

Thus having described the invention, what is claimed is:

1. A resin suitable for the formation of an air-drying surface coating film, which resin consists essentially of the polycondensation reaction product of reactants (A) an acidic member selected from the class consisting of benzene tricarboxylic acids and anhydrides thereof, (B) a monohydroxyalkylene tetrahydrofuran having from 1 to about 4 carbon atoms in said alkylene group, said reactant B being present in a mole ratio to said reactant A of from about 0.4 to about 1, and (C) a material affording on the average of about 2 hydroxyl groups per molecule selected from the class consisting of (1) hydroxyl group-containing esters of unsaturated fatty acids having at least 10 carbon atoms per molecule of fatty acid and polyhydric paraffinic alcohols having from 3 to 4 hydroxyl groups per molecule of alcohol and (2) alcoholysis products of fatty oils and polyhydric alcohols having from 3 to 4 hydroxyl groups per molecule of alcohol, said fatty oil being selected from the class consisting of drying oils and semidrying oils;

said reactant C being present in a mole ratio to said reactant A of from about 0.8 to about 1.9, and the ratio of the total hydroxyl groups of said reactants B and C to total acidic groups of said reactant A is from about 0.9 to about 1.4;

said resin being characterized by an acid number in the range of about 25 to 70, and by having improved air-drying properties when exposed to the atmosphere at atmospheric temperatures in the form of a surface coating film.

2. The resin of claim 1 wherein said resin consists essentially of the reaction product of said reactants (A), (B) and (C) together with reactant (D) a member selected from the class consisting of (1) polyalkylene glycol monoalkyl ethers having from 2 to 8 ether groups, each alkylene group having from 2 to 3 carbon atoms, and said alkyl group having from 1 to 8 carbon atoms, (2) saturated alcohols having from 2 to about 18 carbon atoms and containing only carbon, hydrogen and oxygen and (3) esters of unsaturated fatty acids containing at least 10 carbon atoms and polyhydric paraffinic alcohols having 2 to 4 hydroxyl groups;

said reactant D being present up to about 0.6 mole per mole of said reactant A;

the sum of said reactants B and D being not more than about 1 mole per mole of said reactant A;

and the ratio of total hydroxyl groups of said reactants B, C and D to total acidic groups of said reactant A being from about 0.9 to about 1.4.

3. The resin of claim 1 wherein said resin consists essentially of the reaction product of said reactants (A), (B), and (C) together with an alkylene glycol containing from 2 to about 7 carbon atoms in said alkylene group;

the sum of said glycol and reactant C being in a mole ratio to said reactant A of from about 0.8 to about 1.9, and said reactant C being present in said sum in an amount sufficient to characterize said resin as an air-drying resin;

and the ratio of total hydroxyl groups of said reactants B, C, and glycol to total acidic groups of said reactant A being from about 0.9 to about 1.4.

4. The resin of claim 1 wherein said reactant A is trimellitic anhydride.

5. The resin of claim 1 wherein said reactant B is a monohydroxymethylene tetrahydrofuran.

6. The resin of claim 1 wherein said reactant C is a monoglyceride of safflower oil fatty acids.

References Cited by the Examiner

UNITED STATES PATENTS

| 2,319,575 | 5/1943 | Agens | 260—77 |
| 2,418,633 | 4/1947 | Gould | 260—77 |
| 3,042,656 | 7/1962 | Frey | 260—77 |
| 3,066,108 | 11/1962 | Broadhead | 260—77 |
| 3,192,174 | 6/1965 | Nichols | 260—22 |
| 3,194,774 | 7/1965 | Nichols | 260—22 |

FOREIGN PATENTS 131,185   1/1949   Australia.

OTHER REFERENCES

Amoco Chemicals Bulletin, "Trimellitic Anhydride," September, 1958.

LEON J. BERCOVITZ, *Primary Examiner.*

DONALD E. CZAJA, *Examiner.*

J. W. BEHRINGER, F. McKELVEY,
*Assistant Examiners.*